Patented Oct. 21, 1952

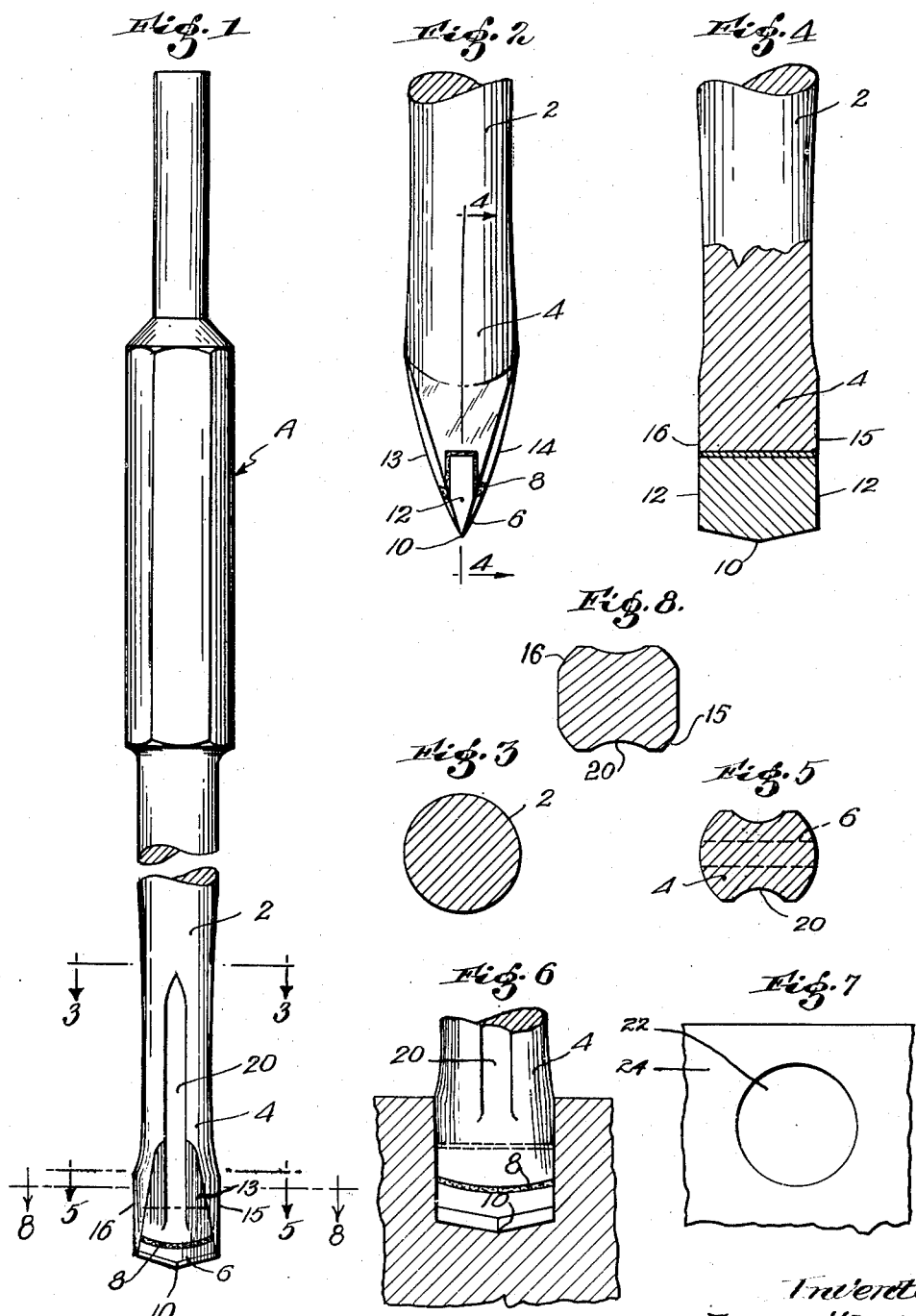

2,614,811

UNITED STATES PATENT OFFICE 2,614,811

DRILL

Norman G. Melendy, Lowell, Mass., assignor to H. E. Fletcher Company, West Chelmsford, Mass., a corporation of Massachusetts Application January 10, 1949, Serial No. 70,072

1 Claim. (Cl. 255—63)

This invention relates to an improved drill of the impact type such as is employed in excavating, mining, quarrying and similar operations, to drill holes in rock bodies and various construction materials, and which is characterized by one or more cutting edges which serve when hammered to chip or break away small fragments of material.

It is a general object of the invention to improve drills of this class and to devise a durable efficient tool which is highly resistant to wear and which will maintain relatively sharp cutting edges for extended periods when subject to repeated drilling operations. It is also an object of the invention to provide a relatively simple composite drill structure which can be easily and quickly assembled and which will resist breaking or separation.

In conventional forms of drills of the impact type such as plug drills and jackhammer drills, the bit or cutting edge is usually designed to flare outwardly from the shank portion of the tool and often the shank is tapered to provide a reduced neck of a diameter substantially less than the diameter of the hole which it is desired to be formed by the cutting edge of the drill. The purpose of the flaring bit and reduced neck construction is to maintain suitable clearance in the hole as the bit wears away and becomes reduced to a size gradually approaching the diameter of the shank. Clearance thus provided is essential to prevent jamming and permit displacement of stone particles which are chipped away by the drill.

To avoid excessive wear of the bit, it has been proposed to utilize with an ordinary steel shank a relatively harder cutting element, consisting of a special tungsten carbide compound sometimes described as cemented tungsten carbide. In practice it is found that the use of tungsten carbide, although greatly reducing occurrence of wear at the bit or cutting edge, nevertheless results in the development of stresses at the lower neck portion of a drill along those sections occurring just in back of the cutting element. It appears that the cumulative shock effect of successively occurring impacts tends to become centralized in those neck portions occurring immediately adjacent to the carbide cutting element with the result that a sharp transverse break often occurs across the neck portion, thus rendering the tool unfit for further use. This breakage may become so frequent that it is more expensive to employ the carboloy tip than the older type of drill.

An important feature of the invention is a composite type of plug drill in which a relatively hard cutting element is provided with end faces and embedded in a special shank mounting so that the end faces constitute wear-resistant sections which extend rearwardly from the bit of the drill for an appreciable distance, and thus comprise a substantial part of the peripheral surface area of the drill when exposed at the two opposite sides of this member. The shank mounting is formed with reinforced portions which lie somewhat in the planes of the end faces so that the reinforced portions are to a material extent protected from abrasion at the point of junction with the cutting element. Furthermore, the reinforced portions are arranged to project rearwardly for some distance along substantially parallel lines which may also lie in the planes of the respective end faces and thus strengthen the regions at which transverse breaking tends to occur along the shank portions of the drill.

These and other objects and novel features will be more fully understood and appreciated from the following description of a preferred embodiment chosen for purposes of illustration and shown in the accompanying drawings, in which Fig. 1 is a view in side elevation illustrating the drill of the invention;

Fig. 2 is a fragmentary elevational view of the drill bit as viewed in one position;

Fig. 3 is a cross section taken on line 3—3 of Fig. 1;

Fig. 4 is a cross section taken on line 4—4 of Fig. 2;

Fig. 5 is a cross section taken on the line 5—5 of Fig. 1;

Fig. 6 is a detail cross section showing the drill in the act of cutting a hole;

Fig. 7 is a detail plan view of the resulting drilled hole in a rock surface; and Fig. 8 is a transverse section taken on the line 8—8 of Fig. 1.

The drill construction shown in the drawing and generally indicated by the arrow A is intended to be illustrative of various forms of impact type drills including jackhammer bits of four edges, rose bits of six edges, etc. and specifically indicates a plug drill having a shank 2 extending between the head of the drill and its cutting edge. Numeral 4 denotes a neck portion of the drill which terminates in a pair of oblique sides 13 and 14. Portions of the bit included between the sides 13 and 14 are formed with an elongated slot extending inwardly of the drill in a longitudinal direction. Located in this slot is a cutting element 6, which is secured by means of soldering metal 8. The drill is preferably composed of a relatively tough shock-resistant steel, while the cutting element 6 is formed of a special carbide compound commonly referred to as cemented tungsten carbide which is characterized by a very high degree of hardness.

Cutting element 6 preferably consists of a somewhat rectangularly shaped blank, formed along one side with a V-shaped cutting edge 10 which extends between two flat end faces 12 of the blank (Fig. 2). The edge 10 is ground so as to result in a centered section which extends slightly beyond opposite extremities. The end faces 12 are chosen of a substantial width and length to provide wear resisting surfaces, and are arranged in the slotted portion of the neck 4 so that they remain exposed and constitute a part of the peripheral surface of the shank as shown in Fig. 2.

Advantage is taken of the exposed end faces to provide reinforcing portions 15 and 16 which fill in the shank portion of the drill at points just in back of the cutting blank and which lie in abutting relation to the exposed end faces in a position to merge with these faces and form a smooth curved contour which is better illustrated in Fig. 5. The reinforcing portions are so constructed as to extend rearwardly throughout the region of the drill where a reduced neck portion would normally occur in a conventional type of tool. The reinforcing portions thus provide for a relatively thickened shank section which is of appreciable length chosen so as to include and protect those portions of the drill where transverse breaking may occur from the use of a tungsten carbide type blank.

There is thus realized a very substantial bodying and strengthening effect in the neck of the drill which can be maintained without being worn away since the end faces cooperate with the surrounding surfaces of the reinforced portion to furnish a composite highly resistant wear surface. It is also pointed out that the diameter of the drill, measured at points between the two end faces, is always approximately equal to the length of the cutting edge at all times so that the size of hole will be determined by this length of the cutting edge. In practice, the action of the drill in response to successive hammer blows, tends to form a drill hole of a diameter slightly exceeding the diameter of the bit, thus automatically insuring a certain amount of clearance which turns out to be pretty nearly constant for a substantial operating period of the tool. Displacement of chips may thus take place through the clearance noted and additional passageways may be provided for example by forming in the oblique sides of the drill grooves or channels 20 extending throughout a substantial part of the neck portion of the drill.

An even greater advantage is derived from incorporating in a drill structure a special bit and reinforced neck construction of the character indicated. Thus it will be observed that the dimensions of the bit included between the end faces of the cutting element in reality determine the diameter of the hole 22 which is drilled in the rock 24. A common difficulty experienced in drilling holes is inability of the operator to center the hole properly as the drill reacts to the hammer blows. The result is often an oversize hole or one which is not correctly directed into the stone body. When the reinforced section of a diameter determined by the end faces can be maintained substantially constant as is possible by the use of the cemented tungsten carbide, then the reinforced section becomes essentially a centering section for guiding the drill along a straight path and consequently the bore of the hole 22 can be directed squarely into the rock as suggested in Fig. 6. Since the side faces of the insert which forms the bit are approximately parallel, and since the insert is very hard, it does not lose any of its diameter until it is practically worn out. Holes drilled with such a bit and centering guide section will therefore be constant in contrast to holes drilled by conventional drills which from their flaring bit construction tend to lean from one side to another as they cut and are very hard to hold.

While I have described one specific form of the invention in which a single cutting edge has been discussed, it should nevertheless be understood that tools having a plurality of cutting edges, disposed either at an angle to one another or in other ways, may be constructed with the same wear-resistant end face and reinforced body construction.

Having thus disclosed my invention and described in detail illustrative embodiments thereof, I claim as new and desire to secure by Letters Patent:

An improved drill for forming holes in granite and similar bodies comprising, in combination, a shank formed with a transverse slot at its lower end and having side wall portions obliquely merging towards said slot, a cutting element having horizontal shoulders defining a rectangular upper shank portion, said rectangular upper shank portion being embedded in the slot in said shank, said cutting element having a cutting edge portion defined by V-shaped walls, the end walls of said cutting element being substantially flat, said flat end walls intersecting the cutting edge and lying in planes parallel to the axis of the drill, said V-shaped walls of the cutting edge portion and adjacent oblique shank portions merging to form continuous bevelled sides which terminate at the outer end in a transverse cutting face, the shank at areas adjoining the opposite flat end faces of the cutting edge being flat and lying flush with the end walls of the cutting element, and the shank further being provided with elongated diametrically arranged relatively thickened areas for a substantial distance to provide projecting reinforced portions whose extremities merge with the flat portions of the shank adjacent the flat end walls of the cutting element, the external surfaces of the projecting portions extending lengthwise in parallel relation to the axis of the drill and along the neck of the drill for a short distance to provide elongated strengthened shock resistant areas, and said shank having longitudinal flutes which continue across said bevelled sides intermediate the reinforced portions to approximately the point of junction between the shank and cutting element.

NORMAN G. MELENDY.

REFERENCES CITED

The following references are of record in the file of this patent:

UNITED STATES PATENTS

| Number | Name | Date |
| --- | --- | --- |
| 821,202 | Thomas | May 22, 1906 |
| 1,428,415 | Brossoit | Sept. 5, 1922 |
| 1,807,646 | Wright | June 2, 1931 |
| 2,030,576 | Erickson | Feb. 11, 1936 |
| 2,101,376 | Voigtlander | Dec. 7, 1937 |
| 2,101,865 | McCallum | Dec. 14, 1937 |

FOREIGN PATENTS

| Number | Country | Date |
| --- | --- | --- |
| 410,947 | Great Britain | May 31, 1934 |

OTHER REFERENCES

Mine and Quary—p. 221, June 1908.